United States Patent [19]

Bell

[11] 4,068,819

[45] Jan. 17, 1978

[54] PORT PROTECTIVE RING IN A MALE MOLD

[75] Inventor: Douglas M. Bell, San Rafael, Calif.

[73] Assignee: Handi-Kup Company, Corte Madera, Calif.

[21] Appl. No.: 729,221

[22] Filed: Oct. 4, 1976

[51] Int. Cl.² .............................................. B29D 27/00
[52] U.S. Cl. .................................. 249/66 A; 425/4 R; 425/573; 425/817 R; 425/DIG. 44; 249/184; 425/812
[58] Field of Search ................... 425/4 R, 437, 817 R, 425/812; 249/66 A, 66, 67, 63, 64, 142, 144, 175, 183, 184, 141

[56] References Cited

U.S. PATENT DOCUMENTS

| | | | |
|---|---|---|---|
| 2,929,124 | 3/1960 | James | 249/183 X |
| 2,976,571 | 3/1961 | Moslo | 425/812 X |
| 2,983,638 | 5/1961 | Quehl | 425/812 |
| 3,170,010 | 2/1965 | Schultz et al. | 425/817 R |
| 3,261,055 | 7/1966 | Dart | 425/817 R |
| 3,341,910 | 9/1967 | Hesselholt | 249/183 X |
| 3,374,983 | 3/1968 | Garretson et al. | 425/812 |
| 3,825,378 | 7/1974 | Dart et al. | 425/4 R |
| 3,939,234 | 2/1976 | Daskew | 249/66 AX |

Primary Examiner—J. Howard Flint, Jr.
Attorney, Agent, or Firm—Townsend and Townsend

[57] ABSTRACT

Protection against fluid port blockage in a mold is provided by a novel, easily mountable fluid port protective ring and combination frustoconical mold having fluid ports in an annular groove of a side wall adjacent an edge defining a circumferential flange. The ring may comprise a non-elastomeric relatively rigid material such as inert plastic, stainless steel or the like. Structurally, the ring includes an internal circumferential shoulder which accommodates the roof or the flange edge of the groove, an inner wall adapted to slip over the roof and fit into the groove to define an annular cavity confronting the fluid ports, and to provide at least one relatively narrow fluid release orifice in fluid communication with the fluid ports for protection of the fluid ports. Typically, the orifice internal diameter is less than about 0.01 inch.

9 Claims, 5 Drawing Figures

U.S. Patent   Jan. 17, 1978   4,068,819
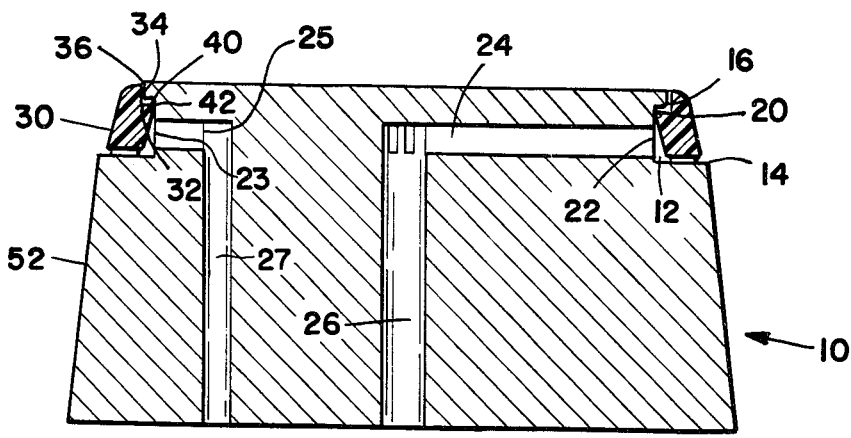
FIG._1
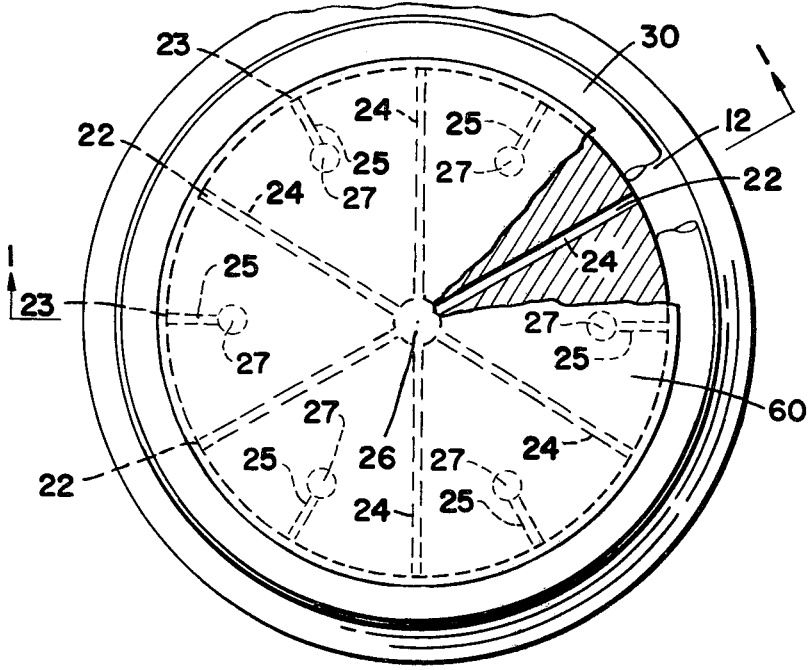
FIG_2
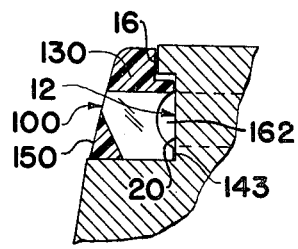
FIG._5.
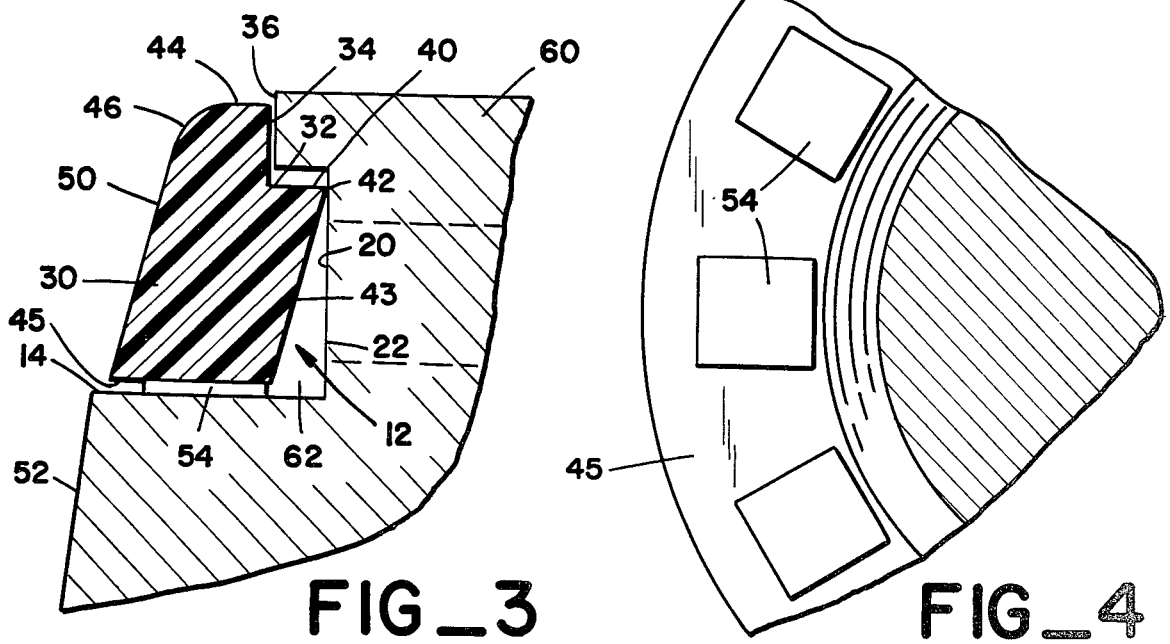
FIG_3    FIG_4

PORT PROTECTIVE RING IN A MALE MOLD

BACKGROUND OF THE INVENTION

1. Field of the Invention

The subject invention is concerned with the formation of thin wall cellular plastic containers such as plastic drinking cups. In manufacturing the containers, expandable resin beads, usually polystyrene beads, are introduced into the space between the male and female mold members. Steam may then be introduced into the cavity between members through internal steam ports in the male mold member to expand the beads and cause the beads to fuse forming the container as the end product. The mold members are then separated, and the container is ejected by a blast of air through air orifices in the male mold member.

The small beads are of small size and comprise a significant amount of very fine particles. The beads and particles upon heating can adhere and clog the ports and orifices, preventing the subsequent introduction of fluids into the mold cavity. It is therefore necessary to provide some means to protect the ports, while allowing for the exiting of the fluid from the port into the mold cavity.

One effort has been directed to the use of an elastomeric ring, which fits snugly against the port, temporarily blocking the ports during the filling of the mold cavity with the beads. Upon applying fluid pressure from the ports, the elastomeric ring expands allowing the passage of fluid. After a relatively short period of time, the elastomeric ring loses its elasticity or wears out, requiring frequent replacement. In addition, the escape of fluids, particularly vapors, about the elastomeric ring causes a characteristic high decibel shrieking noise, which is particularly annoying and is subject to prohibition or elimination under safety standards. It is therefore desirable to find an alternative means which prevents the ports from clogging while minimizing high decibel noise and provides for relatively infrequent changes of the protective mechanism.

2. Brief Description of the Prior Art

U.S. Pat. No. 3,825,378 describes a mold having an annular groove employing an elastomeric ring as a check valve. This patent also refers to the relevant prior art.

SUMMARY OF THE INVENTION

Protection against fluid port blockage in a mold is provided by a novel easily mountable fluid port protective ring and combination frustoconical mold having fluid ports in an annular groove of a side wall adjacent an edge defining a circumferential flange. The ring may comprise a non-elastomeric relatively rigid material such as inert plastic, stainless steel or the like. Structurally, the ring includes an internal circumferential shoulder which accommodates the roof or the flange edge of the groove, an inner wall adapted to slip over the roof and fit into the groove to define an annular cavity confronting the fluid ports, and to provide at least one relatively narrow fluid release orifice in fluid communication with the fluid ports for protection of the fluid ports. Typically, the fluid port opening is less than about 0.01 inch.

BRIEF DESCRIPTION OF THE DRAWINGS

FIG. 1 is a cross-sectional schematic view of the male mold with a fluid channel, inlet port, and protective ring;

FIG. 2 is a top schematic view of the male mold element showing the radially extending channel bores in the top wall thereof and a portion broken away to show the ring element in its operative use position;

FIG. 3 is an expanded cross-sectional elevational view of the protective ring and a portion of the male mold member;

FIG. 4 is a view from below of a portion of the protective ring; and

FIG. 5 is an expanded cross-sectional view of another embodiment of the port protective ring according to the invention.

DESCRIPTION OF THE SPECIFIC EMBODIMENTS

A frustoconical male mold member for forming a thin wall container is provided having a U-shaped annular groove in an upper portion of the mold with a plurality of fluid ports in the side wall of the groove. The fluid ports or orifices are generally of two types: ports for the introduction of high temperature fluid such as steam which fuse the moldable material into the mold shape, and ports for the introduction of relatively dry, high velocity fluid, such as air, for ejection of the molded piece. According to the invention, fitted into the groove over the fluid ports is a non-elastomeric protective ring defining a circuitous fluid path between the ports and the mold cavity for preventing clogging of the ports or orifices.

The ring is generally composed of an inert non-elastomeric plastic, although it may be formed of any non-elastomeric material which does not bond with the molding material. The ring typically has an internal circumferential shoulder at the top with the inner side angling outwardly and downwardly, so that the upper portion of the inner side is in juxtaposition to or touching the side wall of the groove, while the bottom of the inner side is displaced away from the side wall of the groove, thereby defining circumferential path between the ring and the mold for fluid exiting from the ports into the mold cavity. The ring may be raised on a small castellation so that the fluid may flow outwardly through spaces under the ring. The castellation may be formed by either grooves or spacing feet provided on the bottom of the ring. Alternatively, radial orifices may be provided through the ring at selected locations to permit fluid escape into the mold cavity.

The outer side of the ring is inclined downwardly in relative alignment with the frustoconical shape of the male mold. The top of the protective ring is flat with the outer corner of the ring being curved. The shape of the ring allows for passage of fluids from the ports into the mold cavity between the male and female mold members, while preventing blockage of the ports and spaces along the bottom of the ring. The ring also allows for a smooth internal ridge in the containers and aids in the ease of ejection of the cup from the male mold, after completion of the fusing of the plastic beads.

The ring may be formed from any convenient resilient plastic or other non-elastomeric material which is inert, has a softening point substantially above the fusion temperature of the resin beads used to form the molded product, has sufficient tensile strength to be able to be slipped over the roof of the annular groove in the male mold without permanent deformation, does not adhere to the plastic material employed for container formation and does not adhere to the mold, precluding easy removal as needed. Illustrative plastics include polyesters, polyolefins, polyethers, etc. Of particular interest is Celcon ®, a polyformaldehyde.

The protective ring is flexible enough and is designed so that the ring can be readily forced over the upper lip of the groove and seated in the groove by pressing down on the ring. Moreover, the ring is easily removable to allow for required ring replacement or service of the mold.

For further understanding of the invention, the drawings will now be considered. In FIG. 1, the upper portion of the male mold 10 is depicted having an annular U-shaped groove 12 with the lower arm or floor 14 being longer than the upper arm or roof 16 of the groove 12. The side wall 20 of the groove 12 has ports 22 and 23 which are evenly spaced about the side wall 20. Conduit 24 connects with central channel 26 for the passage of fluid to the ports 22. Similarly, conduit 25 connects with channel 27 for the passage of fluid to ports 23.

The port protective ring 30 has a circumferential shoulder 32 with the vertical face 34 in close proximity to the upper outer wall 36 of the mold 10. The horizontal face 40 of the shoulder is below the roof 16 of the groove with the inner ede 42 touching or in close proximity to the side wall 20 of the groove 12.

Turning now to FIG. 2, the ring 30 is shown locked in groove 12 with a plurality of horizontal conduits 24 provided through the ceiling 60 of the male mold member 10. The conduits 24 for conveying either steam or air to the groove 12 communicate with the vertical central channel 26, connecting the central channel 26 with the ports 22. Additionally, channels 27 for conveying pressurized air or steam to the groove 12 communicate with conduits 25 connecting the outer channels 27 with ports 23.

In FIG. 3 the inner wall 43 is shown to slant away from the side wall 20 of the groove 12. This creates a circumferential fluid channel and also directs fluid flow from the ports 22 downwardly and outwardly along the groove floor 14. The top surface 44 of the ring 30 is flat, having a curved corner 46 which connects with the outer wall 50, which slants downwardly at an angle substantially in alignment with the outer wall 52 of the male mold member 10.

The outward and downward slant of the inner wall 43 also permits the ring 30 to be easily snapped over the groove flange 36, since the ring 30 need not be substantially expanded in order for it to fit into place.

The side wall 20 and the ring inner wall 43 confronting the side wall 20 and the ports 22 and 23 together define a fluid distribution chamber 62 for communicating fluids from the ports 22 and 23 to outlet narrow apertures as explained hereinbelow.

As an alternative to an outwardly downward slanted inner wall 43, for example, the inner wall 43 may be shaped to define an inwardly facing annular recess defining a fluid distribution channel.

According to the invention, the protective ring 30 covers the ports 22 (and 23) to prevent particulate material in the mold cavity from clogging the channels 24 and 25. Small, spaced apart feet 54 create narrow slots along the bottom wall 45 to permit adequate fluid flow to the mold cavity while protecting the ports 22 (and 23). The desired effect could similarly be obtained by molding slots, either vertically or horizontally in the ring inner surface or by providing a castellation along the bottom wall 45 to establish venting along surface 14.

As depicted in FIGS. 3 and 4, the feet 54 may be positioned adjacent the internal wall 14 of the ring 30 and will normally be spaced apart by at least about 10°, usually not exceeding 50°, more usually not exceeding 30°. The feet 54 normally extend annularly at least about 5°, and usually do not exceed about 20°, more usually from about 10°–15°.

Various fluids may be introduced through the vertical central channel 26, and the outer channel 27, such as air through channel 27 and steam through channel 26, depending upon the desired function. Steam is introduced to provide for heating of the beads in the mold cavity for fusion of the beads to form a molded container.

Referring to FIG. 3, the steam may exit from the ports 22 into the chamber 62 or like fluid distribution channel and pass through the apertures defined by the under surface 45 of the ring 30 and the groove floor 14 into the mold cavity defined by the male mold member 10 and the female mold, not shown. Similarly, air can be introduced through the ports 23 and through apertures of surface 45 so as to eject the container or similar molded piece after fusion of the beads.

The feet 54 or other suitable spacers space the ring 30 from the floor 14, so as to leave a separation for passage of fluid between the ring 30 and the floor 14. The under surface 45 of the ring 30 is preferably flat so as to maintain a substantially even spacing between the floor 14 and the ring 30. The floor 14 is preferably flat and smooth to promote easy cleaning if necessary.

The height of the feet 54 is generally less than about 0.01 inch, and typically less than about 0.007 inches, preferably being from about 0.003–0.006 inches, more preferably being about 0.004–0.005 inches, thus defining a flat. With this spacing, free passage of fluid exiting from the ports into the mold cavity is achieved, while plugging of the ports and the channels leading to the ports is effectively prevented.

FIG. 5 illustrates an alternative embodiment of a port protector as mounted into mold groove 12 over the upper lip 16. The protector comprises a rigid ring 130 including therein a plurality of fixed narrow radial perforations 100 through the ring outer wall 150 which define the protective fluid outlet apertures. The narrowest dimension of the perforations 100 is selected to be less than the mean cross-sectional dimension of the resin beads used to form the molded object. The ring 130 is provided with a circumferential void along its inner wall 143 to form a circumferential fluid distribution channel 162 between the groove side wall 20 and the ring inner wall 143 confronting the groove side wall 20.

The subject invention provides a number of advantages over the prior art. The rings are readily molded and easily mounted onto the male mold for the thin wall container. Relatively infrequent changes of the protective rings due to wear, distortion, and the like are required. The rings effectively prevent the plugging of the ports and allow for free flow of fluid into the mold cavity. The inclusion of the perforations or creation of aperture in the removable ring makes cleaning of the perforations or aperture virtually unnecessary since the ring is expendable and easily replaced. In addition, the passage of fluid does not result in any shrieking or undesirable high frequency sound, which is a serious disturbance to work. Finally, the containers are readily removed and ejected from the mold member, the protective ring aiding in the easy ejection of the container when an air stream is introduced from the ports.

Although the foregoing invention has been described in some detail by way of illustration and example for purposes of clarity of understanding, it will be obvious that certain changes and modifications may be practiced within the scope of the appended claims.

I claim:

1. A ring for protecting a U-shaped annular venting groove circumscribing a frustoconical male mold used for forming objects of expansible resin beads comprising:
    a rigid, nonexpansible, nondeformable annular element of a diameter adapted to snap over said male mold and to fit into said groove
    wherein said element when in position in said groove defines an annular fluid distributing chamber and at least one permanently open fluid outlet aperture
    and wherein said aperture is for establishing a restriction having a minimum dimension less than the mean cross-sectional dimension of the unexpanded resin beads, for providing a continuous fluid flow path and for minimizing flow induced noise during fluid escape.

2. A protective ring according to claim 1, wherein said at least one aperture is established between said element and said groove.

3. A protective ring according to claim 2, wherein said aperture is formed by a castellation forming a flat along a side of said annular element.

4. A protective ring according to claim 2, wherein the minimum restriction dimension of a flat is less than about 0.01 inch and greater than about 0.003 inches.

5. A protective ring according to claim 1, wherein said at least one fluid outlet aperture comprises a radial perforation through said annular element.

6. A protective ring according to claim 1, wherein said annular element is a non-elastomeric plastic.

7. A ring for protecting a vented annular U-shaped groove circumscribing a frustoconical male mold, said groove having an upper wall, a lower wall and a side wall, said upper wall being shorter than the lower wall and said side wall having a plurality of vent ports, said ring comprising:
    a rigid, nonexpansible, nondeformable annular element of a diameter adapted for snapping over said upper wall and for fitting into said groove, said ring having an internal shoulder along a first lateral margin and a castellation along a second opposing lateral margin, and wherein said annular element when in position in said groove defines an annular fluid distribution chamber with said internal shoulder adapted for mating with a corner of said upper wall and said castellation adapted for providing a plurality of narrow permanently open fluid outlet apertures.

8. A vent protecting ring according to claim 7 wherein said inner wall of said annular element, when in position in said groove, is adapted for slanting from said shoulder to said second lateral margin away from said groove side wall to a element radius greater than the radius of said mold at said upper shoulder for forming said annular chamber, and wherein said shoulder when in position in said groove is adapted for axial displacement of said annular element from said lower wall to said upper wall.

9. A protective ring according to claim 7 wherein said nonelastomeric material is a polyformaldehyde plastic.

* * * * *